Patented July 6, 1954

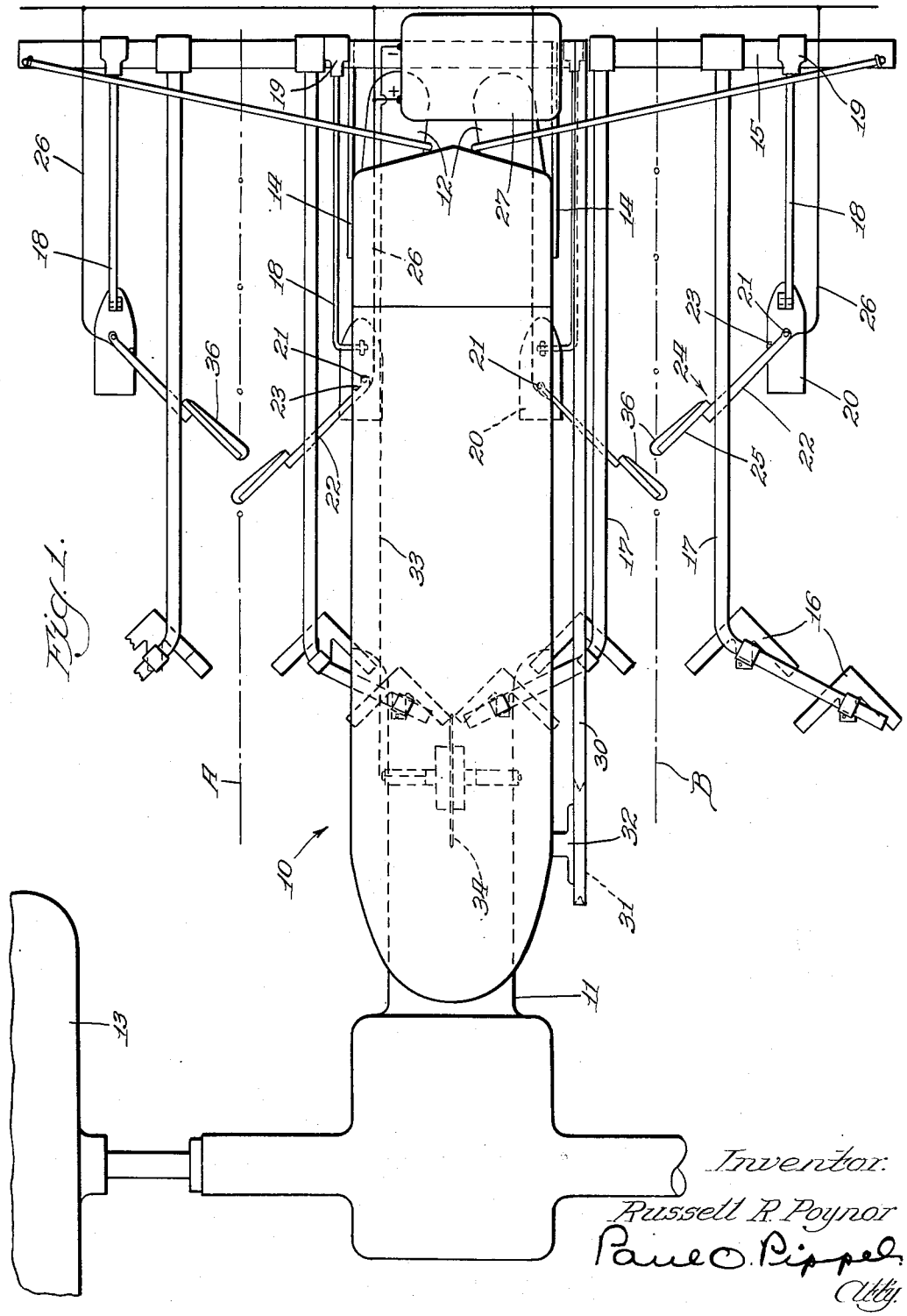

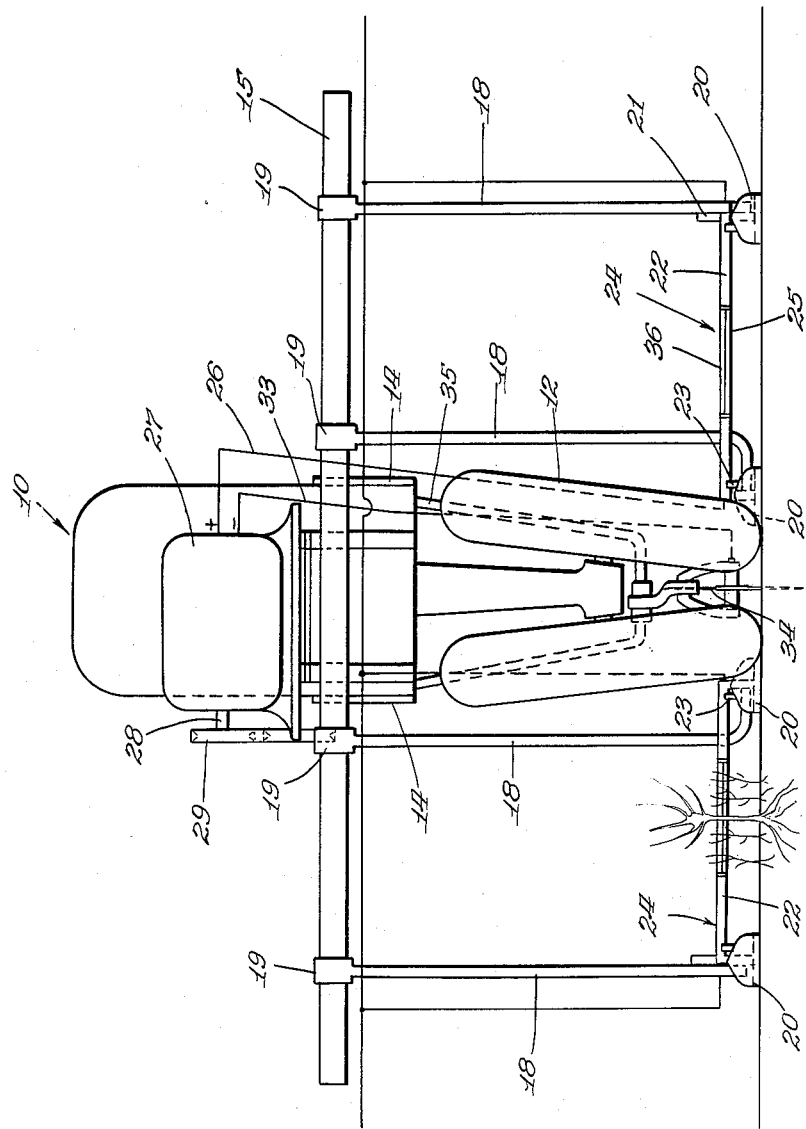

2,682,729

UNITED STATES PATENT OFFICE 2,682,729

ELECTRIC WEED KILLER

Russell R. Poynor, Elmhurst, Ill., assignor to International Harvester Company, a corporation of New Jersey Application December 26, 1947, Serial No. 793,843

7 Claims. (Cl. 47—1.3)

This invention relates to the destruction of weeds and the like which tend to interfere with and retard the growth of selected vegetation. The invention concerns particularly a machine for the cultivation of crop plants and apparatus therefor.

An object of the invention is to provide a novel apparatus for the cultivation of growing plants.

Another object of the invention is to provide a means for the destruction by electricity of weeds and like vegetation in the vicinity of growing crop plants.

The invention is specifically described in its relation to the cultivation of row crop plants by mechanism carried upon a vehicle having a power plant for propelling the vehicle and the cultivating mechanism over a planted field in a direction parallel to the plant row. The utilization of a charge of electricity for destroying the undesirable vegetation may, of course, depending upon the magnitude of the electric charge, involve the protection of the cultivated growing crop from injury, and another object of the invention is the provision of a method and means for the destruction of undesirable vegetation in a crop row substantially without injury to the crop plants.

The method and apparatus described herein are more readily adaptable to the cultivation of plants which rapidly develop a large strong stem and a root system which firmly holds the plant to the soil. Such a plant is resistant to a charge of electricity which will kill a weaker plant and is sturdy enough to offer considerable resistance to a bending force that would readily bend weaker and more pliable vegetation.

A further object of the invention, therefore, is the provision of mechanism mounted upon a power propelled vehicle carrying a member of electrically conductive material having sufficient rigidity to brush over weeds growing in a crop row but being flexibly mounted to permit the member to yield upon encountering the greater resistance of the crop plant.

Another object of the invention is to supply electricity to the charged member from a source on the vehicle and to provide insulation at the point of contact of the member with the growing plant to avoid injury thereto.

Other objects and advantages of the invention will become clear from the following description when read in conjunction with the accompanying drawings, wherein:

Fig. 1 is a plan view of a tractor-mounted cultivator embodying the features and principles of the present invention.

Fig. 2 is a front elevation of the structure shown in Fig. 1, certain parts being removed for clarity.

With reference to the drawings, it will be observed that the numeral 10 designates a conventional tractor having a body 11 enclosing a conventional power plant. The tractor is the straddle-row tricycle type having front wheels 12 and laterally spaced rear drive wheels 13, only one of which appears in the drawing.

Secured to opposite sides of the tractor body at the front end thereof are plates 14, which extend forwardly and serve for the attachment of a transverse tool-bar 15. Tool-bar 15 extends laterally from opposite sides of the tractor and functions as supporting means for cultivating mechanism including conventional cultivator shovels 16 carried at the rear ends of drag links 17, the front ends of which are suitably connected to the bar 15 for vertical movement with respect thereto.

A pair of drag links is provided at each side of the tractor to work opposite sides of crop rows A and B, while the front wheels 12 travel between the rows. The shovels 16 penetrate the ground at the sides of the plant row and in the space between the rows, disturb the soil, and destroy weed roots. Weeds also thrive in the plant row between and around the crop plants and on each side thereof. The destruction of weeds in the plant row is accomplished by mechanism now to be described:

Drag links 18 are pivotally connected at their forward ends to brackets 19 secured to the transverse tool-bar 15. Each of the drag links 18 extends downwardly and rearwardly from the tool-bar and by virtue of its pivotal connection thereto is capable of independent vertical floating movement with respect to the tractor and with respect to the shovels 16. On opposite sides of the tractor the drag links 18 are arranged in pairs, one on each side of its associated plant row. Secured to the rear end of each drag link 18 is a longitudinally extending ground engaging shoe 20 which is turned upwardly at its forward end, as indicated in Fig. 2, and which rises and falls with the changes in contour of the ground independently of the movement of the tractor.

Each of the ground engaging shoes 20 has mounted thereupon a vertically extending pin 21 which has one end of a leaf spring 22 secured thereto and coiled thereabout (see Fig. 1). Leaf spring 22 extends laterally outwardly from the shoe 20 and by virtue of its connection to the pin 21 has a forward bias which accommodates yielding thereof rearwardly and the return thereof to the position indicated in Fig. 1, which is the normal operating position of the leaf spring 22. A stop 23 likewise mounted upon the shoe 20 engages the forward face of the spring 22 to limit the forward movement thereof. Leaf spring 22 forms a part of a member 24 which includes an electrically conductive element 25 which is secured to the outer portion of the leaf spring 22. This element 25 is rectangular in cross-section and serves to carry the electric charge by which the weeds in the plant row are destroyed as hereinbefore set forth. The members 24 carried by the gauge or ground contacting shoes 20 extend in opposite directions from each pair of gauge shoes on opposite sides of the tractor. In other words, each of the members 24 is directed toward the associated plant row and extends across it in the path of the crop plants and of the weeds. These members overlap so that the weeds on opposite sides of the crop plants and between the crop plants are engaged thereby during the progress of the tractor 10 as it traverses the field to be cultivated.

An electric current is supplied to the conducting elements 25 of the members 24 through suitable insulated wires 26 from the positive pole of a generator 27 mounted upon the tractor at the forward end thereof. It may be understood that the generator 27 is of conventional construction and requires no detailed description other than to indicate that its shaft 28 extending from one end thereof has secured thereto a pulley 29 which is drivingly connected by a belt 30 with a pulley 31 mounted upon a power take-off shaft 32 suitably driven in a manner, not shown, by the tractor power plant. As indicated in the drawings, the generator is grounded by the connection of a wire 33 between the negative pole of the generator and a coulter 34 mounted upon a hanger 35 suitably secured to the body of the tractor. The connection of the wires from the generator terminal to the various elements 25 of the members 24 is indicated diagrammatically in the drawings. It may be understood that conventional control mechanism, not shown, such as a switch may be provided to turn the current from the generator on and off at will.

As pointed out heretofore the present invention is particularly adaptable for use in cultivating crop plants which are resistant to the quantity of electrical energy necessary to destroy or substantially impair the growth of weeds in the plant row. It may likewise be understood that in certain stages of growth of weeds, they are more resistant than at other times and that greater or less amperage may be required depending upon the stage of growth of the weeds. Crop plants such as cane, corn and cotton, particularly the latter, are well adapted to withstand an electric charge which will destroy the weeds and grasses which appear in the crop row. Cotton particularly develops a woody stem which is a great deal more resistive to electric shock than the weeds in a plant row. It is therefore contemplated that the member 24 may contact all of the vegetation in a cultivated row and the amperage delivered from the generator 27 to the conductive element 25 may be such as to substantially destroy the weeds in the crop row without substantial injury to the crop plant.

In order to avoid injury to the crop plant, a shield 36 made of any suitable non-conducting material, such as porcelain covered metal, is provided which is arranged to extend outwardly from the forward face of the element 25 and to partly surround the element, leaving the lower face of the element unprotected. The shield 36 serves to engage and insulate the crop plants from the conducting element 25.

As pointed out before, the member 24 is sufficiently rigid that it will traverse the field and bend the weeds in the row downwardly. The weeds thus brush against the under and rear surface of the conducting elements 25 and receive the full charge of the electric current directed thereto from the generator 27. On the other hand, the crop plant is merely contacted by the non-conducting shield 36, and since the crop plant is sturdier than the weeds and will not bend, the members 24 yield rearwardly until the crop plant is passed so that no part of the element 25 engages the crop plant. Each member 24 immediately swings back into its operating position upon passing the crop plant and comes into engagement with its stop member 23.

While it has been pointed out that this invention is effective in the killing of weeds in a plant row, it may be understood that insects in the row contacted by the conducting element 25 will likewise be destroyed. It may also be understood that while many parts of the cultivating machine shown in the drawings have been eliminated in order to simplify the illustration of the essential features of the present invention, suitable lifting mechanism may be provided upon the tractor for raising and lowering the drag links 17 and 18 and their associated operating elements. The shovels 16 are associated with the electrical members 24 in order that the soil may be suitably broken up on opposite sides of the plant row and between the rows.

The invention has been described in its preferred embodiment. However, it may be understood that modifications may be made therein without departing from the spirit of the invention. It is therefore desired that the invention be limited only by the scope of the appended claims.

What is claimed is:

1. In a machine for destroying undesirable vegetation in a crop row between and around growing stemmed row crop plants, a vehicle having a power plant and a source of electric current thereon, a member formed of electrically conductive material carried by the vehicle extending transversely of the crop row and engageable with the vegetation therein, means for directing an electric current from the source to said member to destroy the vegetation engaged thereby, means flexibly connecting the member to the vehicle to accommodate yielding thereof rearwardly upon contact of the member with the stemmed plant, and means insulating the plant against the member to avoid injury thereto, said member having a non-conducting plant contacting shield projecting forwardly therefrom and engageable with the crop plant to space the electrically conductive member therefrom and prevent injury to the crop plants.

2. In a machine for destroying undesirable vegetation in a crop row between and around growing stemmed row crop plants, a wheeled vehicle having a power plant and a source of electric current thereon adapted to be propelled in a direction parallel to the plant row, a member formed of electrically conductive material carried by the vehicle extending laterally therefrom generally parallel to the ground and across the plant row, means pivotally connecting said member to the vehicle for swinging movement on a generally vertical axis, said member being adapted to engage and bend over the weeds in the row and on opposite sides thereof but yieldable upon encountering the greater resistance of the stemmed crop plant, means for directing an electrical current from the current source on the vehicle to said member, and means for insulating the member in the area of contact thereof with the plant, whereby the weeds are destroyed without injury to the crop plant.

3. In a machine for destroying undesirable vegetation such as weeds in a crop row between and around growing stemmed row crop plants having greater resistance to bending than the weeds, a wheeled vehicle having a power plant and a source of electric current thereon, a member formed of electrically conductive material extending laterally of the plant row in engagement with the vegetation therein and adapted to bend the weeds, so that they contact the under surface of the member as the vehicle moves over the ground, a separate ground support for said member carried by the vehicle adjacent the plant row adapted to rise and fall with respect to the vehicle, whereby the member may be maintained at a substantially constant height above the ground in response to changes in ground contour, the mounting of said member upon said ground support being flexible to accommodate yielding thereof upon encountering said stemmed plants, means for directing an electrical current from said source to said member, and means for insulating the plant contacting portion of the member to avoid injury to the crop plant.

4. In a machine for destroying undesirable vegetation such as weeds in a crop row between and around growing stemmed row crop plants having greater resistance to bending than the weeds, a wheeled vehicle having a power plant and a source of electric current thereon, a member formed of electrically conductive material extending laterally of the plant row in engagement with the vegetation therein and adapted to bend the weeds, so that they contact the under surface of the member as the vehicle moves over the ground, a separate ground support for said member carried by the vehicle adjacent the plant row adapted to risse and fall with respect to the vehicle, whereby the member may be maintained at a substantially constant height above the ground in response to changes in ground contour, the mounting of said member upon said ground support being flexible to accommodate yielding thereof upon encountering said stemmed plants, means for directing an electrical current from said source to said member, and a shield of non-conductive material carried by the member arranged to engage the crop plant and insulate it from the member.

5. A cultivating machine for destroying weeds growing around stemmed row crop plants comprising a wheeled vehicle having a power plant and a source of electric current thereon, a pair of ground supports carried upon the vehicle for vertical floating movement with respect thereto and to each other and arranged to engage the ground at each side of the plant row, a member of electrically conductive material mounted at one end upon each said support and extending laterally across the plant row from opposite sides thereof in the path of the vegetation therein, and means for transmitting an electric current from the source on the vehicle to said member of sufficient magnitude to destroy the vegetation in the row, and a shield carried by said member for insulating the member against contact with the stemmed crop plants.

6. A cultivating machine for destroying weeds growing around stemmed row crop plants comprising a wheeled vehicle having a power plant and a source of electric current thereon, a pair of ground supports carried upon the vehicle for vertical floating movement with respect thereto and to each other and arranged to engage the ground at each side of the plant row, a member of electrically conductive material mounted at one end upon each said support for swinging movement about a vertical axis and extending laterally across the plant row from opposite sides thereof in the path of the vegetation therein, the mounting of said member including flexible means accommodating yielding thereof upon engagement with the stemmed crop plant, means for transmitting an electric current from the source on the vehicle to said member, and shield means for insulating the member against contact with the stemmed crop plants.

7. In a machine for destroying undesirable vegetation in a crop row between and around growing stemmed row crop plants, a vehicle having a power plant and a source of electric current thereon, a member formed of electrically conductive material carried by the vehicle extending transversely of the crop row and engageable with the vegetation therein, means for directing an electric current from the source to said member to destroy the vegetation engaged thereby, means flexibly connecting the member to the vehicle to accommodate yielding thereof rearwardly upon contact of the member with the stemmed plant, and insulating means between the plant and the member and carried by the member, said insulating means comprising a member of non-conducting material engageable with the crop plant and avoiding injury to the plant.

References Cited in the file of this patent

UNITED STATES PATENTS

| Number | Name | Date |
|---|---|---|
| 492,635 | Sharp | Feb. 28, 1893 |
| 779,791 | Lokuciejewsky | Jan. 10, 1905 |
| 1,661,030 | Burt | Feb. 28, 1928 |
| 2,007,383 | Opp | July 9, 1935 |
| 2,378,440 | Scott | June 19, 1945 |